(12) United States Patent
Endo et al.

(10) Patent No.: US 6,977,644 B2
(45) Date of Patent: Dec. 20, 2005

(54) MULTI-DIRECTIONAL PRESSURE-RESPONSIVE INPUT DEVICE

(75) Inventors: Yoshihisa Endo, Fukushima-ken (JP); Takashi Nakai, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 281 days.

(21) Appl. No.: 10/355,888

(22) Filed: Jan. 31, 2003

(65) Prior Publication Data
US 2003/0146900 A1 Aug. 7, 2003

(30) Foreign Application Priority Data
Feb. 6, 2002 (JP) ............................. 2002-029536

(51) Int. Cl.[7] .......................... G09G 5/08; H03K 17/94; A63F 13/00
(52) U.S. Cl. .......................... 345/157; 341/34; 463/37
(58) Field of Search ............................... 345/156, 161, 345/157; 463/37; 341/34

(56) References Cited

U.S. PATENT DOCUMENTS

| | | | | |
|---|---|---|---|---|
| 4,301,337 A | * | 11/1981 | Eventoff | 200/5 A |
| 4,433,217 A | * | 2/1984 | Griffith | 200/5 R |
| 5,278,557 A | * | 1/1994 | Stokes et al. | 341/34 |
| 5,396,443 A | * | 3/1995 | Mese et al. | 713/321 |
| 5,431,064 A | * | 7/1995 | Franz | 73/862.68 |
| 5,555,004 A | * | 9/1996 | Ono et al. | 345/161 |
| 5,815,139 A | * | 9/1998 | Yoshikawa et al. | 345/157 |
| 5,883,617 A | * | 3/1999 | Yoshikawa | 345/157 |
| 5,912,612 A | * | 6/1999 | DeVolpi | 338/95 |
| 5,945,979 A | * | 8/1999 | Rutledge et al. | 345/161 |
| 6,310,606 B1 | * | 10/2001 | Armstrong | 345/161 |
| 6,504,492 B1 | * | 1/2003 | Muurinen | 341/22 |
| 6,617,982 B1 | * | 9/2003 | Ogata et al. | 341/34 |
| 2001/0017592 A1 | * | 8/2001 | Armstrong | 341/34 |
| 2002/0000971 A1 | * | 1/2002 | Armstrong | 345/156 |
| 2002/0021280 A1 | * | 2/2002 | Kato et al. | 345/156 |
| 2002/0065134 A1 | * | 5/2002 | Ogata et al. | 463/37 |

FOREIGN PATENT DOCUMENTS

WO    WO 00/64548    11/2000

* cited by examiner

Primary Examiner—Ryan Yang
(74) Attorney, Agent, or Firm—Brinks Hofer Gilson & Lione

(57) ABSTRACT

The input device of the invention includes: a lower sheet on which four resistors are formed in a manner that each two of them with a center put in between are placed to face each other circumferentially with a spacing of about 90°; an upper sheet overlying the lower sheet with a spacing, on which conductors are formed to face the respective resistors; elastic bodies disposed over the upper sheet to face the respective conductors; and an operation member to retain upper parts of the elastic bodies. And, when the operation member is pressed downward, the elastic bodies are brought into contact with the resistors with interventions of the conductors on the upper sheet.

12 Claims, 10 Drawing Sheets

MULTI-DIRECTIONAL PRESSURE-RESPONSIVE INPUT DEVICE

This application claims the benefit of priority to Japanese Application 2002-029536, filed on Feb. 6, 2002.

BACKGROUND OF THE INVENTION

1. Field of the Invention

The present invention relates to an input device of a mobile electronic apparatus such as a portable telephone, specifically to an input device capable of inputting the direction and strength of a pressing force when a key top (operating member) is pressed.

2. Description of the Related Art

The input device of a conventional portable telephone is made up with a printed circuit board 81, metal contacts 83, a contact sheet 84, and a key top 85, as shown in FIG. 9 and FIG. 10.

The printed circuit board 81 has plural pairs of fixed contacts 86a, 86b printed on the surface thereof, as shown in FIG. 9.

FIG. 10 illustrates the switch structure to put a pair of the fixed contacts 86a, 86b into a conductive state, and the other fixed contacts have the same structure. As shown in FIG. 10, the metal contact 83 overlies the fixed contacts 86a, 86b mounted on the printed circuit board 81 so as to face each other, and the contact sheet 84 is adhered on the printed circuit board 81 with the metal contact 83 put in between.

The metal contact 83 is made of a domed thin metal having a structure capable of elastic deformation, and the circumference thereof is in contact with the fixed contact 86b.

And, the key top 85 overlies the contact sheet 84 vertically movably to face the metal contact 83, and has a downward convex projection formed to face the center of the metal contact 83.

Now, in this state, pressing the key top 85 downward deforms the metal contact 83 to bring both the pair of fixed contacts 86a, 86b into contact, whereby the pair of fixed contacts 86a, 86b are made conductive, and a key input detection circuit (not illustrated) detects that the fixed contacts 86a, 86b are conductive, thereby discriminating a key input.

When a pressing load to the key top 85 is released, the key top 85 returns to the original position by the restoring force of the metal contact 83, and the fixed contacts 86a, 86b are made non-conductive.

In the same manner as the fixed contacts 86a, 86b, a set of fixed contacts 88, 89, 90, 91 that allow four inputs of right, left, up, and down directions is printed on the upper front of the printed circuit board 81, as shown in FIG. 9.

When the input operation of the corresponding direction is made by a pair of the fixed contacts 88, 89, 90, 91 being made conductive as mentioned above, the portable electronic apparatus shifts the cursor according to the operated direction, and scrolls the characters and images displayed.

Recent developments have implemented some input devices detect not only the on-off digital inputs of up, down, right, and left directions but also detect the strength of force (analog value) during the operation.

In the input device as shown in FIG. 11, four resistors 92, 93, 94, 95 are printed on the printed circuit board 81, instead of the fixed contacts 88, 89, 90, 91 for four directional inputs in FIG. 9.

FIG. 12 is a sectional view that illustrates the upper structure of the resistor 92 of these resistors, and the other resistors 93, 94, 95 have the same structure as well.

As shown in FIG. 12, the resistor 92 is printed on the printed circuit board 81, and a downward convex conductive rubber 96 is located to overlie the resistor 92.

The conductive rubber 96 is fixed to the key top 85 by way of an elastic body 97. The key top 85 is energized upward by an elastic body not illustrated, and the resistor 92 faces the conductive rubber 96 with a slight spacing.

In this state, when the key top 85 is pressed down, the conductive rubber 96 is lowered, the conductive rubber 96 comes in contact with the resistor 92, the contact area made by the conductive rubber 96 and the resistor 92 varies according to the pressing force, and the resistance across the resistor 92 varies.

As the pressing force to the key top 85 becomes stronger, the contact area of the conductive rubber 96 and the resistor 92 becomes larger; and as the contact area becomes larger, the variance (decrease) of the resistance across the resistor 92 becomes greater. Therefore, it is possible to calculate the force applied to the key top 85 by detecting the variance of the resistance.

When the load to the key top 85 is released, the key top 85 returns to the original position by the restoring force of the elastic body not illustrated, and the resistor 92 is made to face the conductive rubber 96 with a slight spacing.

The circuit to detect the resistance of the resistor 92 is configured with the four resistors 92, 93, 94, 95, and a controller (CPU) 98, as shown in FIG. 13.

The controller 98 has analog voltage input terminals A/D1, A/D2 that input analog voltages, and plural input/output terminals not illustrated, etc.

One end of the resistor 92 is connected to one end of the resistor 93, and the resistors 94 and 95 are connected in the same manner. The other ends of the resistor 92 and 94 are connected to a power supply Vcc, and the other ends of the resistor 93 and 95 are connected to the ground.

The node of the resistors 92 and 93 is connected to the analog voltage input terminal A/D1, and the node of the resistors 94 and 95 is connected to the analog voltage input terminal A/D2.

And, the controller 98 is designed to monitor the analog voltages to be inputted to the analog voltage input terminals A/D1 and A/D2.

In the initial state that the resistors 92, 93, 94, 95 and the conductive rubber 96 face each other with a slight spacing, the resistances of the resistors 92, 93, 94, 95 are equal, and both the two analog voltage input terminals A/D1, A/D2 input the voltage of Vcc/2 accordingly.

In this state, when the key top 85 is pressed to bring the conductive rubber 96 into contact with the resistor 92(X+), for example, the resistance across the resistor 92 decreases; and accordingly, the analog voltage input terminal A/D1 inputs a voltage higher than Vcc/2, and the analog voltage input terminal A/D2 inputs the voltage of Vcc/2, which is not varied.

Here, since the voltage inputted to the analog voltage input terminal A/D1 has become higher than Vcc/2, the controller 98 detects that the conductive rubber 96 comes into contact with the resistor 92(X+), calculates the variance of the resistance of the resistor 92 from the analog voltage, calculates the strength of the force that has pressed the key top 85 from the variance of the resistance, and outputs the result from the output terminal (not illustrated).

In the portable electronic apparatus, the direction of shifting the cursor and the direction of scrolling the images are controlled from the direction thus outputted, and the speed of shifting the cursor and the speed of scrolling are controlled from the strength of force thus outputted.

However, in this type of input device having the fixed contacts 86a, 86b printed on the printed circuit board 81, there occur wear and smear on the fixed contacts 86a, 86b, which lowers the reliability and shortens the life of the contacts, thus presenting a problem to be solved.

If the number of key switches is increased to make the input device multi-functional, the fixed contacts 86a, 86b will have to be printed on the printed circuit board 81 by the number of switches to be increased; and since the wiring space is required for the number of switches increased, to miniaturize the printed circuit board 81 has been an obstacle to make the input device multi-functional.

Further, since the defects of the contact sheet 84 cannot be discovered before the contact sheet 84 is adhered on the printed circuit board 81, the replacement of the defective contact sheet 84 has required trouble of peeling it off the printed circuit board 81, and so on.

Further, since the conductive rubber 96 is put into contact with the resistor 92 to produce the variance of the resistance, and in addition to the short life of contacts of the conductive rubber 96 itself due to abrasion, and further since the conductive rubber 96 is directly pressed to the resistor 92 made of carbon, for example, the life of the conductive rubber 96 by abrasion is further shortened accordingly, which is a problem.

Furthermore, in the circuit to detect the resistances of the resistors, since the controller 98 has to be monitoring the analog voltages inputted to the analog voltage input terminals A/D1 and A/D2, the power consumption increases only to shorten the continuous operational time, which is a problem.

SUMMARY OF THE INVENTION

The present invention has been made in view of the above problems, and an object of the invention is to provide an input device that enhances the reliability and extends the life, facilitates the setting of multi-functions and replacements if found defective, and reduces the power consumption.

In order to solve the foregoing problems, the input device according to one aspect of the invention includes: a lower sheet on which four resistors are formed in a manner that each two of them with a center put in between are placed to face each other circumferentially with a spacing of about 90°; an upper sheet overlying the lower sheet with a spacing, on which conductors are formed to face the respective resistors; elastic bodies disposed over the upper sheet to face the respective conductors; and an operation member to retain upper parts of the elastic bodies. Further, this input device is constructed in a manner that, when the operation member is pressed downward, the elastic bodies are moved downward, the upper sheet is bent, and contact areas of the conductors and the resistors are varied, and thereby operation of the operation member is detected.

This construction brings the elastic bodies made of rubber or the like into contact with the resistors on the lower sheet with interventions of the upper sheet and the conductors, whereby the abrasion of the elastic bodies is reduced, and the life thereof is prolonged to enhance the reliability. Further, it does not need a conductive rubber, thus leading to lowering the production cost.

The input device is also constructed in a manner that the operation member retains the four elastic bodies, the operation member is inclined, the elastic bodies are moved downward, the upper sheet is bent and the contact areas of the conductors and the resistors are varied, and thereby the position and strength at and by which the operation member is operated are detected.

This construction allows the detection of slant directional operations as well as the detection of up, down, right, and left directional operations, and also the detection of the force strength when operated, which achieves a control that a user can easily manipulate.

According to another aspect of the invention, the input device further includes a controller having first and second output terminals, analog voltage input terminals, and a trigger signal input terminal, which is capable of switching a status into a first mode that outputs a high level voltage only to the first output terminal or a second mode that outputs a low level voltage to the first output terminal and the high level voltage to the second output terminal. And in this construction, the controller is configured in a manner that, in the first mode, the status is switched into the second mode when the analog voltage input terminals receive a voltage of a predetermined value for a specified period of time, and in the second mode, the status is switched into the first mode when the trigger signal input terminal receives the high level voltage; the two facing resistors are each connected in series to each other; each of the resistors on one end is connected to the first output terminal, and each of the resistors on the other end is grounded; the conductors each are connected to the second output terminal; and nodes of the resistors on one side are connected to the analog voltage input terminals and the trigger signal input terminal.

Thanks to this construction, the controller switches the status into the second mode when the operation member is not operated for a predetermined period of time, in which the voltage is not applied to the resistors, thus reducing the power consumption.

The input device is also constructed in a manner that each of the nodes is connected to the trigger signal input terminal through an OR circuit, and each of the conductors is connected to the second output terminal through a reverse-current blocking diode.

Thanks to this construction, even if, in the second mode, any of the resistors comes in contact with the corresponding conductor, the trigger signal input terminal will receive the high level voltage; and, even if, in the first mode, one of the resistors comes in contact with the corresponding conductor to apply a voltage to the conductor, it will not give any influence to the other conductors.

The input device is also constructed in a manner that the lower sheet has plural lower contacts formed thereon, the upper sheet has upper contacts formed thereon to face each of the lower contacts, and the lower contacts and the upper contacts that face each other are made conductive by the operation member provided over the upper sheet being pressed.

Thanks to this construction, the members for inputting operational directions and the members for key inputs can be integrally formed, which contributes to reducing the production cost. Since the members for key inputs are constructed only inside the upper and lower films, the construction is very resistant to corrosions to contribute to high reliability and a prolonged life of these members, and also facilitates to discover defects.

The input device is also constructed in a manner that elastic members made of a domed metal are provided over the upper sheet to face each of the lower contacts and the upper contacts that face each other, and the elastic members are deformed by the operation member being pressed, whereby the lower contacts and the upper contacts that face each other are made conductive.

This construction gives a user a feeling of click during operation, and the user can confirm secure operation.

DESCRIPTION OF THE PREFERRED EMBODIMENT

Figure 1:
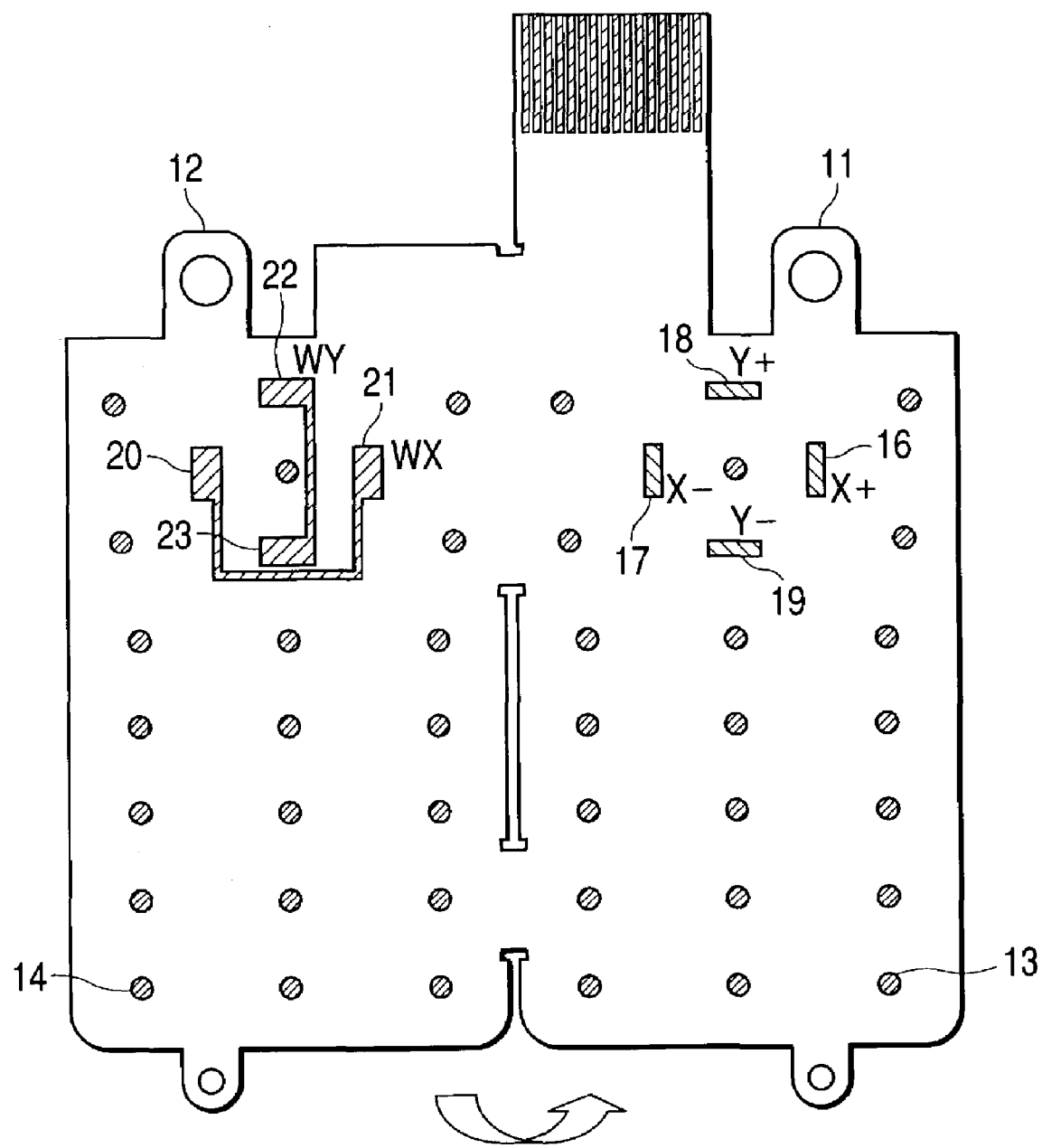
FIG. 1 is an explanatory chart of the upper and lower sheet of an input device according to the present invention.
Figure 3:
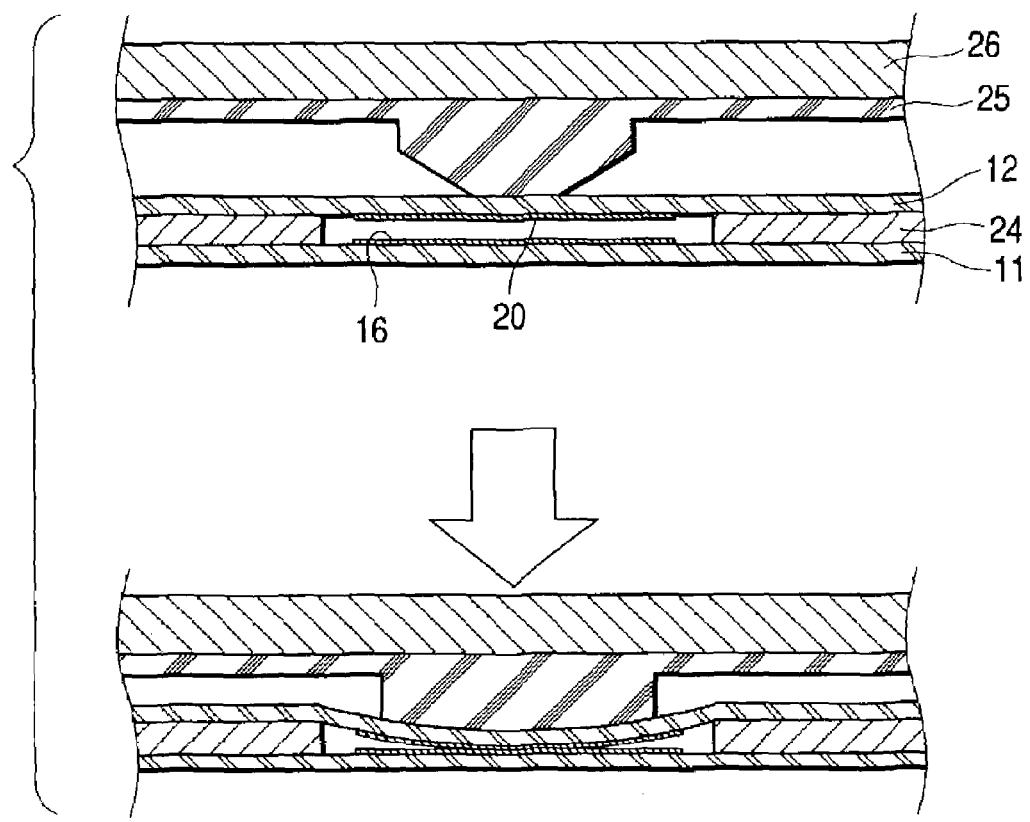
FIG. 3 is a sectional view explaining the construction to vary the resistance of a resistor of the input device according to the present invention.
Figure 4:
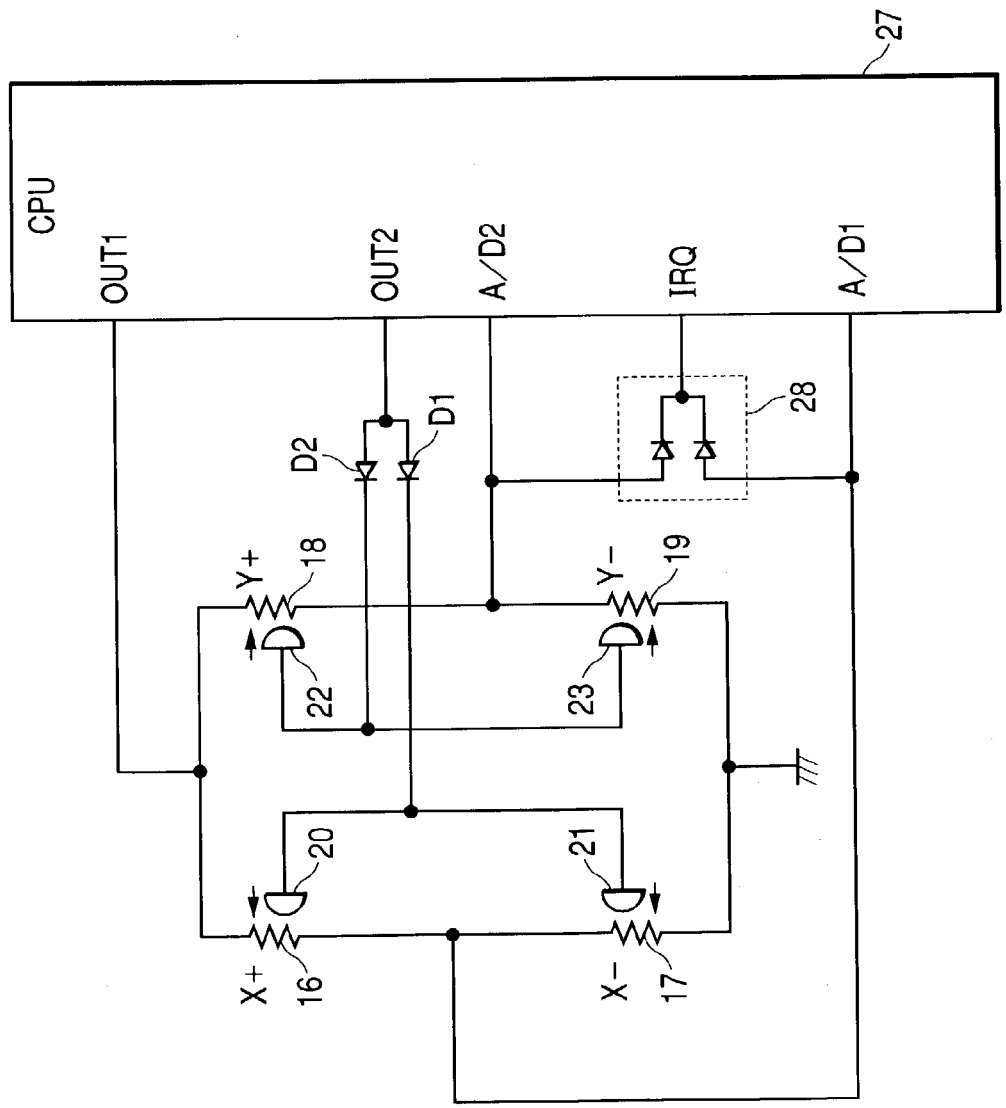
FIG. 4 is a circuit diagram of a detection circuit for the resistance of the resistor of the input device according to the invention present.
Figure 5:
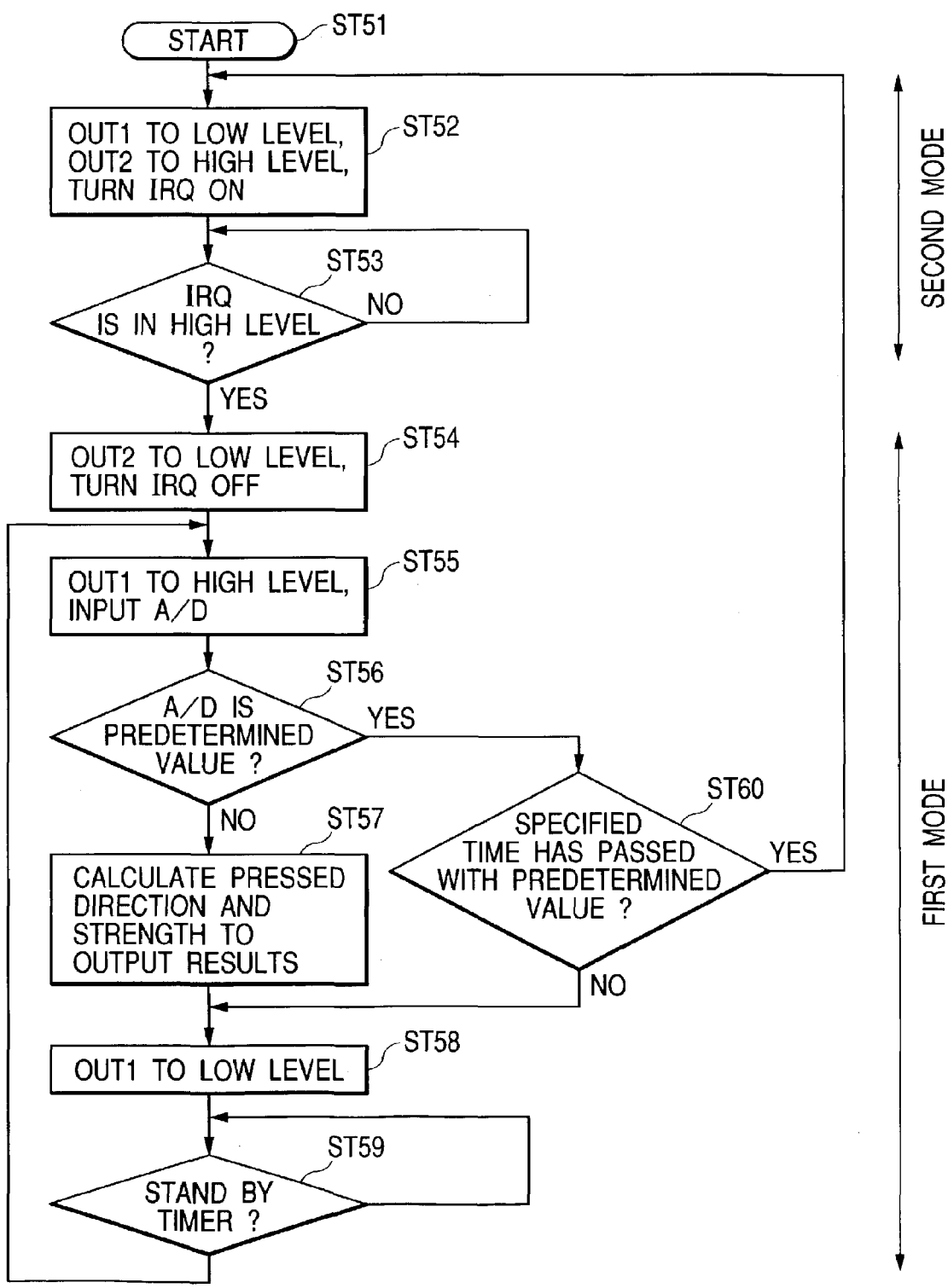
FIG. 5 is a flowchart explaining the operation of a controller of the input device according to the present invention.
Figure 6:
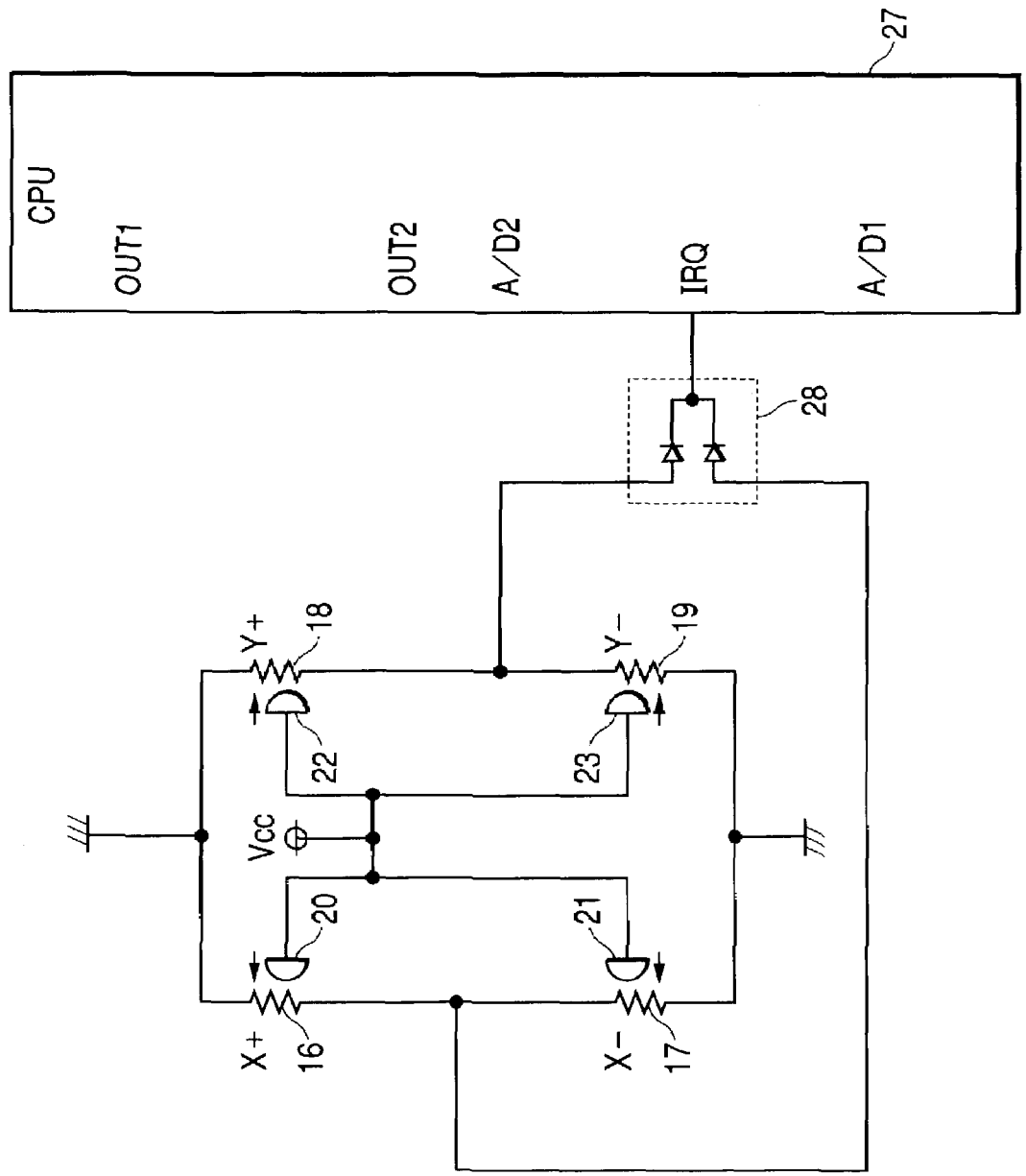
FIG. 6 is an equivalent circuit diagram in the stop mode of the circuit that detects the resistance of the resistor of the input device according to the present invention.
Figure 7:
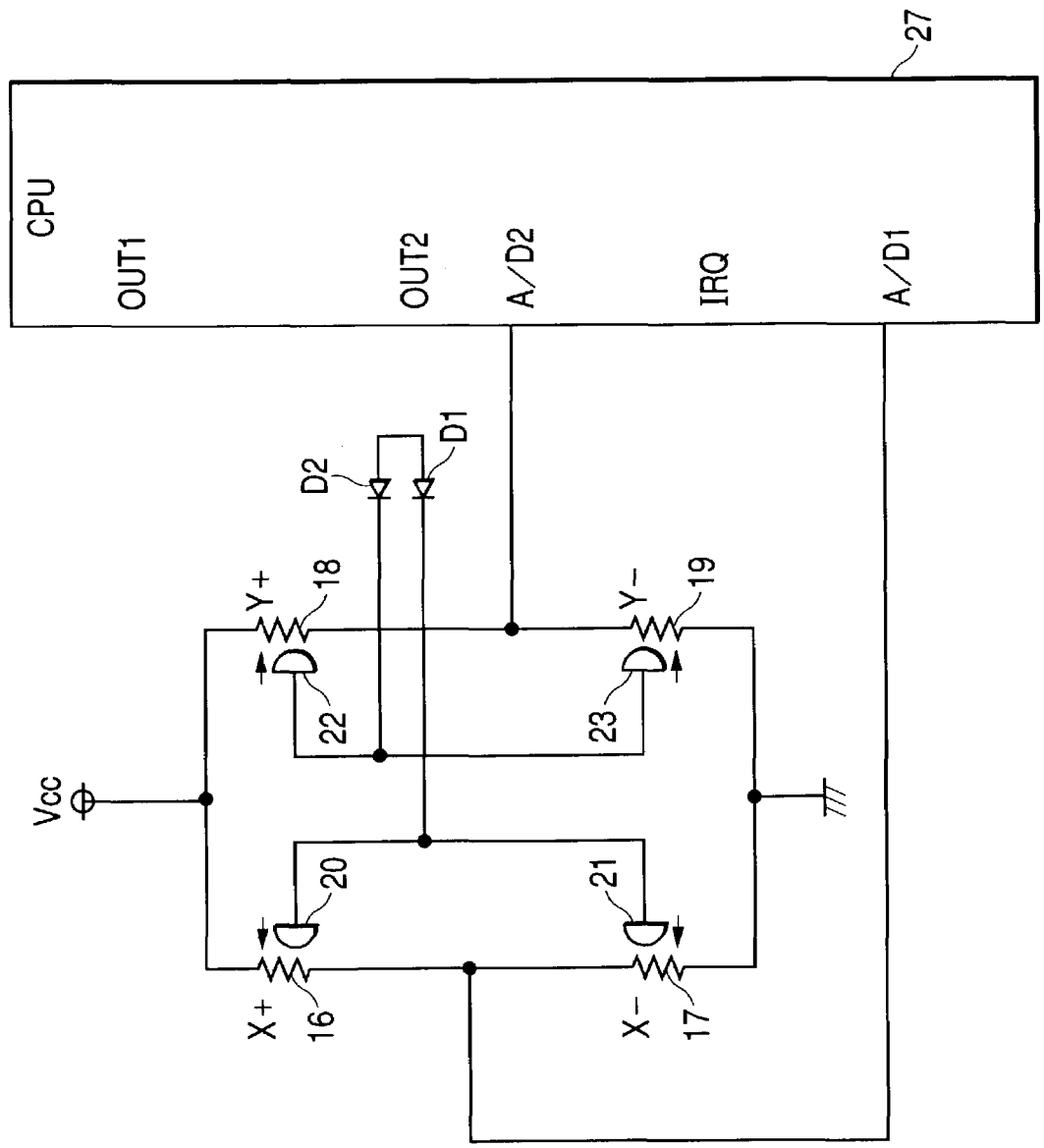
FIG. 7 is an equivalent circuit diagram in the normal mode of the circuit that detects the resistance of the resistor of the input device according to the present invention.
Figure 8:
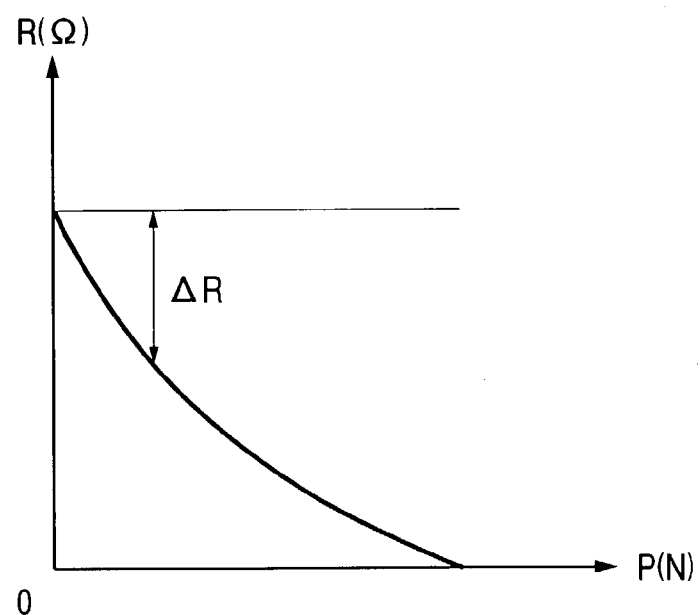
FIG. 8 is a chart illustrating the relation between a resistance across the resistor and a force applied to a conductor of the input device according to the present invention.
Figure 9:
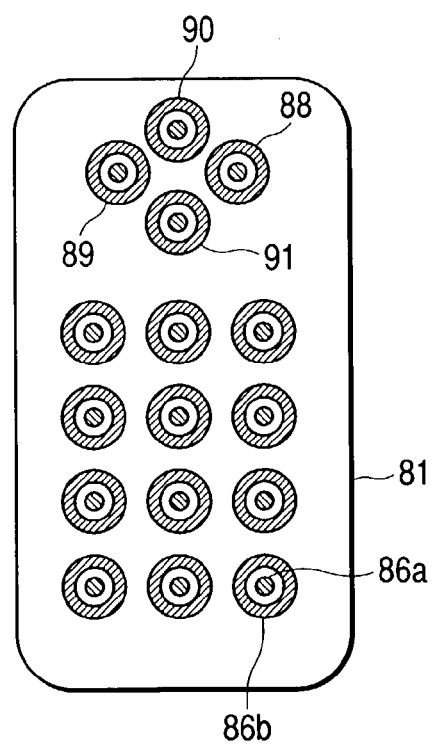
FIG. 9 is a chart that explains the layout and structure of fixed contacts for switches and fixed contacts for directional inputs, which are printed on a printed circuit board of a conventionally proposed input device.
Figure 10:
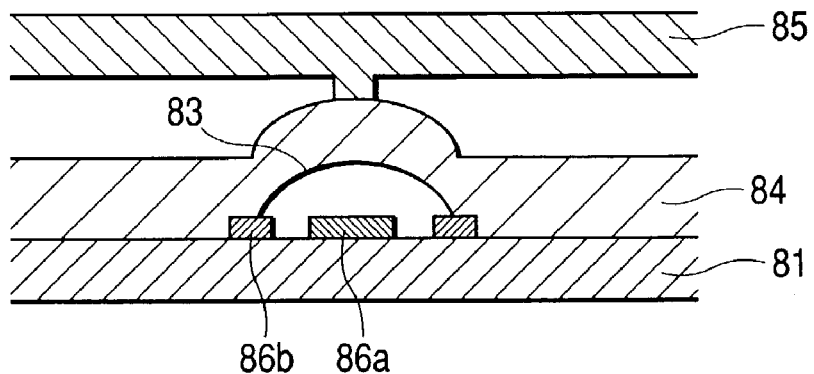
FIG. 10 is a sectional view explaining the switch structure that makes a pair of fixed contacts conductive of a conventionally proposed input device.
Figure 11:
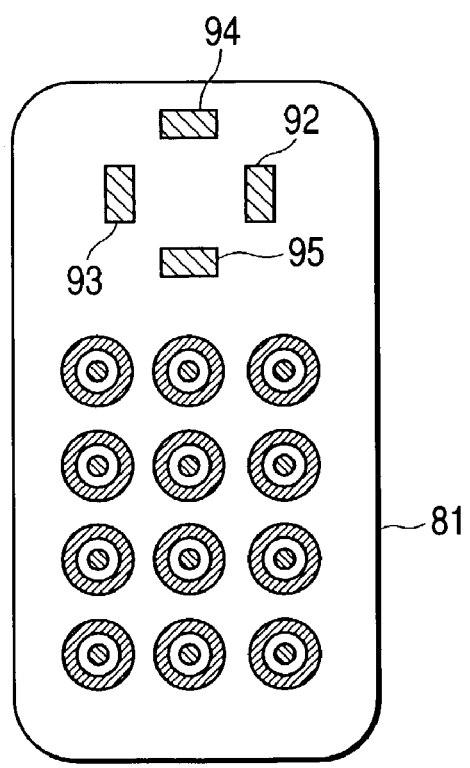
FIG. 11 is a chart that explains the layout and structure of fixed contacts for switches and resistors for directional inputs, which are printed on a printed circuit board of a conventionally proposed input device.
Figure 12:
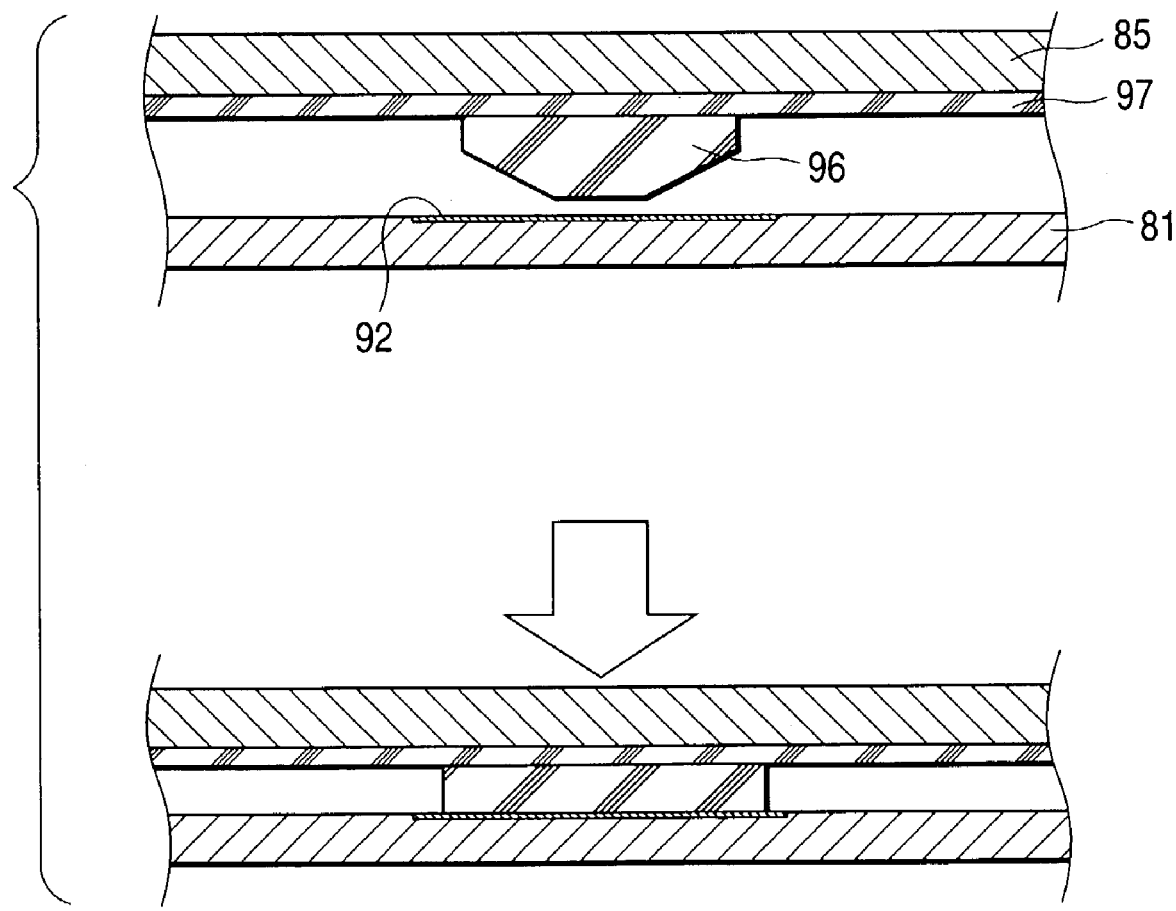
FIG. 12 is a sectional view explaining the construction to vary the resistance of a resistor of a conventionally proposed input device.
Figure 13:
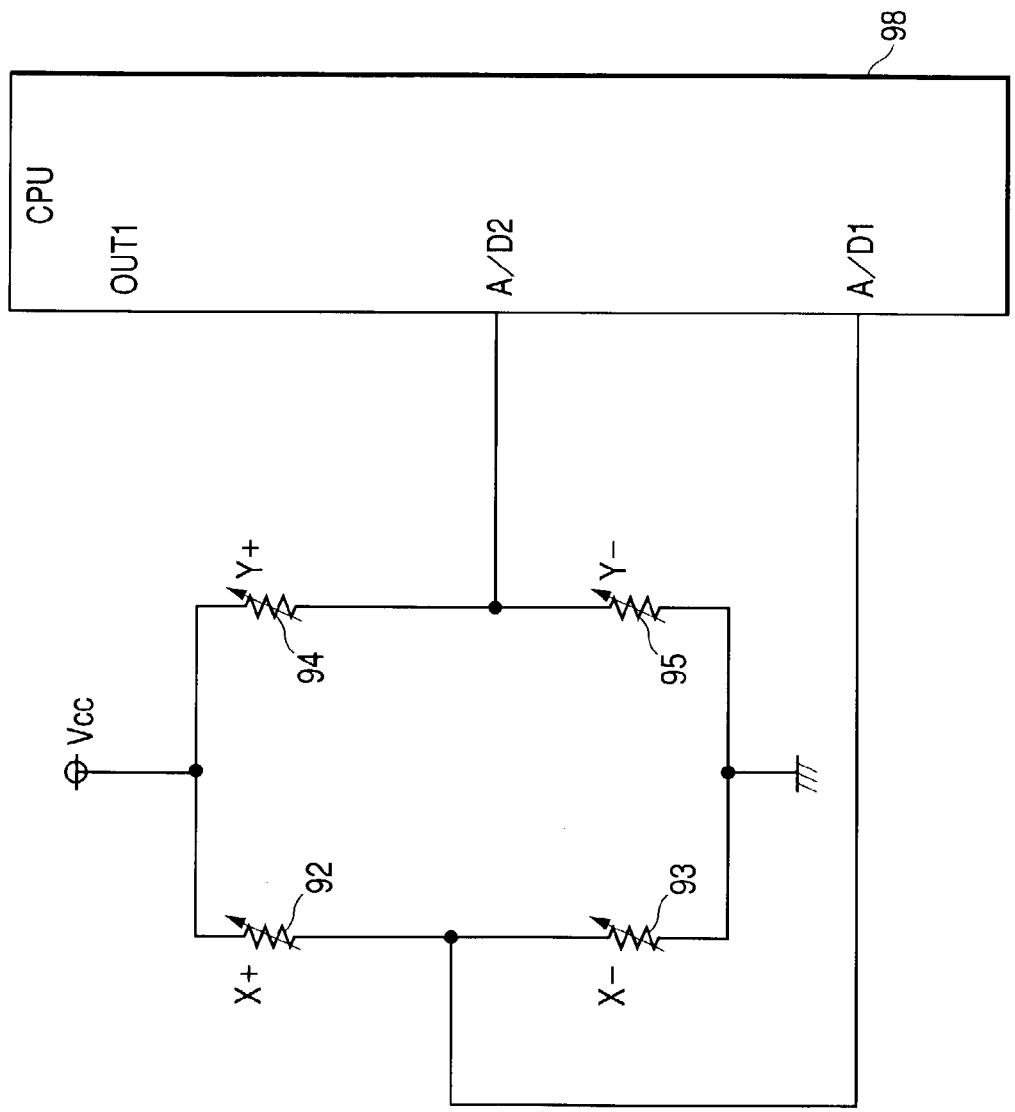
FIG. 13 is a circuit diagram of a detection circuit for the resistance of the resistor of a conventionally proposed input device.

The preferred embodiment of the input device according to the invention will be described based on FIG. 1 through FIG. 8. FIG. 1 explains the upper and lower sheet of the input device according to the present invention, FIG. 2 illustrates a section of a key switch of the input device according to the present invention, FIG. 3 illustrates a section of the construction to vary the resistance of a resistor of the input device according to the present invention, FIG. 4 illustrates a circuit to detect the resistance of a resistor of the input device according to the present invention, FIG. 5 is a flowchart explaining the operation of a controller of the input device according to the present invention, FIG. 6 illustrates an equivalent circuit in the stop mode of the circuit to detect the resistance of the resistor of the input device according to the present invention, FIG. 7 illustrates an equivalent circuit in the normal mode of the circuit to detect the resistance of the resistor of the input device according to the present invention, and FIG. 8 illustrates the relation between a resistance across the resistor and a force applied to a conductor of the input device according to the present invention.

As shown in FIG. 1, the input device according to the invention is made up of a lower sheet 11 and an upper sheet 12. The lower sheet 11 and upper sheet 12 are made of a sheet of film, which is folded in half on the center when assembled.

A plurality of lower contacts 13 for key inputs are printed on the lower sheet 11. And a plurality of upper contacts 14 each facing the lower contacts 13 are printed on the upper sheet 12.

Figure 2:
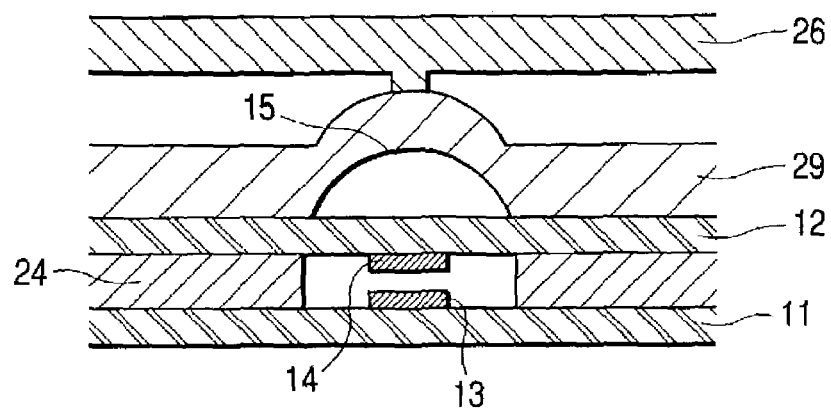
FIG. 2 is a sectional view illustrating the construction of a key switch of the input device according to the present invention.

FIG. 2 is a sectional view illustrating the construction of a switch for the key input.

As shown in FIG. 2, the lower sheet 11 and the upper sheet 12 are bonded with an intervention of a spacer 24 described later.

Further, a metal contact 15 is disposed over the upper sheet 12 so as to face a pair of the lower contact 13 and the upper contact 14.

The metal contact 15 is made of a domed thin metal, and assumes a structure capable of elastic deformation.

A key top (not illustrated) is placed vertically movably over the metal contact 15 with an intervention of a contact sheet 29 so as to face the metal contact 15, and the key top has a downward convex projection formed to face the center of the metal contact 15.

In this state, pressing the key top downward deforms the metal contact 15, so that the lower contact 13 on the lower sheet 11 and the upper contact 14 on the upper sheet 12 come in contact, whereby the lower contact 13 and upper contact 14 are made conductive. A key input detection circuit (not illustrated) detects the lower contact 13 and upper contact 14 that are made conductive, and discriminates a key input.

When a load applied to the key top is released, the key top returns to the original position by the restoring force of the metal contact 15, and the lower contact 13 and upper contact 14 are made non-conductive.

Now, when the metal contact 15 elastically deforms and recovers its original posture, the user feels a click and confirms the key operation.

Since the switch structure of the lower contact 13 and upper contact 14 is made only inside the upper and lower sheets 11, 12, it is very resistant to corrosions to contribute to a prolonged life, and it facilitates to discover defects, thus enhancing the reliability.

Next, as shown in FIG. 1, four resistors 16(X+), 17(X−), 18(Y+), 19(Y−) for right, left, up, and down directional inputs, which are made of carbon, for example, are printed on the upper side of the lower sheet 11 with a spacing of about 90° in such a manner that two of them face each other with the center put in between. Conductors 20(X+), 21(X−), 22(Y+), 23(Y−) made of silver, for example, are printed on the upper sheet 12 so as to correspondingly face the resistors 16, 17, 18, 19 on the lower sheet 11. The conductors 20, 21 (WX) are connected with a printed pattern, and the conductors 22, 23 (WY) are connected with a printed pattern.

FIG. 3 is a sectional view explaining the construction to vary the resistance of the resistor 16(X+), and the other resistors 17, 18, 19 have the same structure.

As shown in FIG. 3, the resistor 16 is printed on the lower sheet 11, and the conductor 20 is printed on the upper sheet 12; and the spacer 24 is provided on the part except for the resistor 16 and the conductor 20.

A downward convex-formed elastic body 25 made of rubber or the like is placed over the upper sheet 12 so as to face the conductor 20.

The elastic body 25 with a downward convex projection is provided to face the other resistors 17, 18, 19 as well, which is fixed to a key top 26 for one directional input. The key top 26 for the directional input is energized upward by an elastic body (not illustrated) for retaining the key top 26, and in the initial state, the lower front of the elastic body 25 is in slight contact with the upper sheet 12.

When the key top 26 is pressed downward in this state, the key top 26 is inclined to lower the elastic body 25, leading to bending the upper sheet 12. Thereby, the conductor 20 and the resistor 16 come in contact, and the contact area varies according to the pressing force, which varies the resistance across the resistor 16.

As the pressing force is stronger, the contact area of the conductor 20 and the resistor 16 becomes larger because the lower part of the elastic body 25 is formed in a convex; and as the contact area becomes larger, the variance (decrease) of the resistance across the resistor 16 becomes greater. Thereby, it becomes possible to calculate the pressing force by detecting the variance of the resistance.

When the load to the key top is released, the key top 26 returns to the original equilibrium by the restoring force of the elastic body for retaining the key top 26; accordingly, the lower front of the elastic body 25 and the upper sheet 12 return to the initial state that they are in slight contact, and the resistor 16 recovers its original resistance.

Thus, the input device according to the invention employing the elastic body 25 made of rubber attains enhanced reliability and prolonged life.

Further, since the elastic body 25 is brought into contact with the resistor 16 on the lower sheet 11 with an intervention of the upper sheet 12, it is difficult to be abraded, and attains a higher reliability and a longer life.

FIG. 4 illustrates a circuit to detect the resistances of the resistors 16, 17, 18, 19 of the input device. As shown in FIG. 4, this detection circuit is configured with the four resistors 16, 17, 18, 19 and the four conductors 20, 21, 22, 23, and a controller (CPU) 27.

In the drawing, the arrows attached to the conductors 20, 21, 22, 23 each signify the moving directions thereof in this circuit diagram, when they are pressed downward.

The controller 27 is equipped with plural input output terminals such as analog voltage input terminals A/D1, A/D2 that input analog voltages, an output terminal OUT1 (first output terminal) and an output terminal OUT2 (second output terminal) that outputs the high level voltage or the low level voltage, and a trigger signal input terminal IRQ that inputs a trigger signal, etc.

The controller 27 is able to switch the state into the normal mode (the first mode) that outputs the high level voltage only to the output terminal OUT1 or the stop mode (the second mode) that outputs the low level voltage to the output terminal OUT1 and outputs the high level voltage to the output terminal OUT2.

The controller 27 is designed to switch the state into the stop mode when, in the normal mode, a specified voltage is inputted both to the analog voltage input terminals A/D1 and A/D2 for a predetermined period of time, and to switch the state into the normal mode when, in the stop mode, the high level voltage is inputted to the trigger signal input terminal IRQ.

Ends of the resistors 16, 17 are connected on one side to make series connection, and the resistors 18, 19 are connected in the same manner. The other ends of the resistor 16 and 18 are connected to the output terminal OUT1 of the controller 27, and the other ends of the resistor 17 and 19 are connected to the ground.

The node of the resistors 16 and 17 is connected to the analog voltage input terminal A/D1, and the node of the resistors 18 and 19 is connected to the analog voltage input terminal A/D2. Further, the both nodes are connected to the trigger signal input terminal IRQ through an OR circuit 28.

The conductors 20, 21 and conductors 22, 23 each connected by a printed pattern are connected through reverse-current blocking diodes D1, D2, respectively, to the output terminal OUT2 of the controller 27.

FIG. 4 shows an example, in which an inexpensive controller 27 with comparably few input output terminals is employed; however if there are input output terminals to spare in the controller 27, the foregoing resistors and conductors can be connected directly to the other input output terminals having equivalent functions of the controller 27, without using the OR circuit 28 and the reverse-current blocking diodes D1, D2, whereby the number of components can be reduced.

FIG. 5 shows the operational flow of the controller 27. In FIG. 5, when the controller 27 is powered (step ST51), the controller 27 outputs the low level voltage to the output terminal OUT1, outputs the high level voltage to the output terminal OUT2, and thereby permits the trigger signal input terminal IRQ to receive the trigger signal (step ST52).

Until the trigger signal input terminal IRQ receives the trigger signal of the high level voltage, the controller 27 stops the other operations to make the stop mode of standby (step ST53).

At this moment, the detection circuit is turned into the equivalent circuit illustrated in FIG. 6. Since the conductors and the resistors are disconnected in this state, the high level voltage from the output terminal OUT2 is not consumed. Therefore, this state is in the mode that hardly consumes the power.

If the key top 26 is pressed down and inclined in this state, for example, and the conductor 20 is lowered to move to the left in FIG. 6, the conductor 20 will come in contact with the resistor 16, and the high level voltage from the output terminal OUT2 will be supplied to the trigger signal input terminal IRQ by way of the resistor 16 and the OR circuit 28. That is, the circuit illustrated in FIG. 6 becomes a circuit that detects the operation of the key top 26 and generates the trigger signal.

And, if the trigger signal input terminal IRQ receives the high level voltage, the controller 27 stops outputting the high level voltage from the output terminal OUT2, inhibits the trigger signal input terminal IRQ from receiving the trigger signal (step ST54), and outputs the high level voltage to the output terminal OUT1. Thus, the state is turned into the normal mode that detects analog voltages being inputted to the analog voltage input terminals A/D1, A/D2 (step ST55).

At this moment, the detection circuit is turned into the equivalent circuit illustrated in FIG. 7. In FIG. 7, when the conductor 20 comes in contact with the resistor 16 to generate a voltage on the conductor 20, the reverse-current blocking diodes D1, D2 prevents the voltage from influencing the conductors 22, 23.

While the key top 26 is not operated, the resistances of the resistors 16, 17, 18, 19 are all equal; and both the two analog voltage input terminals A/D1, A/D2 are made to input a specific voltage of Vcc/2.

However, since the conductor 20 is in contact with the resistor 16, the resistance across the resistor 16 is decreased, and the analog voltage input terminal A/D1 inputs a voltage higher than Vcc/2.

Then, the controller 27 compares whether or not the voltages inputted to the analog voltage input terminals A/D1, A/D2 are equal to Vcc/2 (step ST56), and answers as not equal (N); thereby, the controller 27 detects that the resistor 16 (X+) and the conductor 20 are in contact, and calculates the variance of the resistance of the resistor 16 from the variance of the voltage (step ST57).

FIG. 8 illustrates the relation between a resistance across the resistor 16 and a force applied to the conductor 20. As shown in FIG. 8, the resistance R ($\Omega$) across the resistor 16 draws a decreasing curve according to magnitude of the force P applied to the conductor 20, and the variance ($\Delta$R) of the resistance is almost proportional to the force P applied to the conductor 20.

Accordingly, the strength of the force applied to the conductor 20 is calculated from the variance ($\Delta$R) of the resistance, and the result is outputted from the output terminal (not illustrated) (step ST57).

And, for the power saving, the controller 27 turns the output terminal OUT1 into the low level (step ST58), and stands by until the next detection time, for example, for 10 milliseconds (step ST59). When the next detection time comes, the processing is repeated from the step ST55.

At the step ST56, when the voltage values inputted to the analog voltage input terminals A/D1, A/D2 are both equal to Vcc/2 (Y), the controller checks whether or not a predetermined time has passed since the voltage values became both equal (step ST60).

When the predetermined time has passed (Y) after they become equal, the processing is repeated from the step ST52, and the status is turned into the stop mode.

When the predetermined time has not passed (N) after they become equal, the processing is repeated from the step ST58.

In this manner, while detecting the variance of the resistance of the resistor 16, and when not detecting any variance of the resistance for the predetermined period of time, the controller 27 switches the status into the stop mode for the power saving to reduce the power consumption.

The method of the processing is not limited to this. It may be arranged in such a manner that, in the normal mode, the controller 27 outputs the low level voltage to the output terminal OUT1 and the high level voltage to the output terminal OUT2 at regular intervals, monitors the trigger signal input terminal IRQ, and switches the status into the stop mode when the trigger signal input terminal IRQ does not receive the high level voltage.

When a slant right upper part (between the conductor 20(X+) and the conductor 21(Y+)) of the key top 26 is pressed down, the resistor 16 and the conductor 20 come in contact, and the resistor 17 and the conductor 21 come in contact. A force Px applied to the conductor 20(X+) and a force Py applied to the conductor 21(Y+) are calculated by the method as mentioned above. Accordingly, the force P applied to the key top 26 is given by the following:

$$P=Px+Py$$

Assuming that the positive direction of the X-axis (direction to the resistor 16) is 0°, and the direction of the key top 26 having been pressed is $\theta$ (°), $\theta$ can be calculated from Py/Px=tan $\theta$. In this manner, even if the pressed position is in a slant direction, the pressed direction and the strength of the pressed force can be calculated, and the controller 27 outputs the result from the output terminal (not illustrated).

The portable electronic apparatus is made to control the direction of shifting the cursor and the direction of scrolling on the basis of the direction thus outputted, and to control the speed of shifting the cursor and the speed of scrolling on the basis of the strength of the force thus outputted; and a slant directional shifting of the cursor and scrolling of the images make it easy for a user to manipulate.

As has been described, the input device according to the invention provides: a lower sheet on which four resistors are formed in a manner that each two of them with the center put in between are placed to face each other circumferentially with a spacing of about 90°; an upper sheet overlying the lower sheet with a spacing, on which conductors are formed to face the respective resistors; elastic bodies disposed over the upper sheet to face the respective conductors; and an operation member to retain the upper parts of the elastic bodies. Further, this input device is constructed in a manner that, when the operation member is pressed downward, the elastic bodies are moved downward, the upper sheet is bent, and contact areas of the conductors and the resistors are varied, and thereby the operation of the operation member is detected. Thus, this construction brings the elastic bodies made of rubber or the like into contact with the resistors on the lower sheet with interventions of the upper sheet and the conductors. Thanks to this construction, the abrasion of the elastic bodies is reduced, and the life thereof is prolonged to enhance the reliability. Further, since it does not need a conductive rubber, the production cost can be reduced.

What is claimed is:

1. An input device comprising:
   a lower sheet on which four resistors are formed around a center, adjacent resistors being about 90° from each other;
   an upper sheet overlying the lower sheet with a spacing, on which conductors are formed to face the respective resistors;
   elastic bodies disposed over the upper sheet to face the respective conductors; and
   an operation member to retain upper parts of the elastic bodies, the operation member being movable in a downward direction or in a slant direction; and
   a controller that converts an analog resistance from each of the resistors into a digital value,
   a switching section having first and second output terminals, analog voltage input terminals, and a trigger signal input terminal, which is capable of switching a status into one of a first mode that outputs a high level voltage only to the first output terminal and a second mode that outputs a low level voltage to the first output terminal and the high level voltage to the second output terminal, wherein
   the switching section is configured in a manner that, in the first mode, the status is switched into the second mode when the analog voltage input terminals receive a voltage of a predetermined value for a specified period of time, and in the second mode, the status is switched into the first mode when the trigger signal input terminal receives the high level voltage;
   each two facing resistors are each connected in series to each other;
   a first resistor each of the two facing resistors is connected to the first output terminal and a second resistor each of the two facing resistors is grounded;
   the conductors each are connected to the second output terminal; and nodes of the resistors on one side are connected to the analog voltage input terminals and the trigger signal input terminal;

wherein by the operation member being pressed downward or in the slant direction, the elastic bodies are moved downward, the upper sheet is bent, and contact areas of the conductors and the resistances of the resistors are varied; and wherein the controller detects a pressing direction and a pressing force of the operation member, and includes a power-saving section that performs switching to a power-saving stop mode when the analog resistance does not vary in a predetermined period.

2. An input device according to claim 1, wherein
each of the nodes is connected to the trigger signal input terminal through an OR circuit; and
wherein each of the conductors is connected to the second output terminal through a reverse-current blocking diode.

3. An input device according to claim 1, wherein
the lower sheet has plural lower contacts formed thereon;
wherein the upper sheet has upper contacts formed thereon to face each of the lower contacts; and
wherein the lower contacts and the upper contacts that face each other are made conductive by the operation member provided over the upper sheet being pressed.

4. An input device according to claim 3, wherein
elastic members made of a domed metal are provided over the upper sheet to face each of the lower contacts and the upper contacts that face each other; and
wherein the elastic members are deformed by the operation member being pressed, whereby the lower contacts and the upper contacts that face each other are made conductive.

5. An input device according to claim 1, wherein the operation member is movable in the downward direction and is movable in a slant direction.

6. An input device according to claim 5, wherein the resistances of the resistors decrease proportionally with increasing pressing force.

7. An input device according to claim 1, wherein the resistances of the resistors decrease proportionally with increasing pressing force.

8. An input device comprising:
a lower sheet on which four resistors are formed around a center, adjacent resistors being about 90° from each other;
an upper sheet overlying the lower sheet with a spacing, on which conductors are formed to face the respective resistors;
elastic bodies disposed over the upper sheet to face the respective conductors; and
an operation member to retain upper parts of the elastic bodies,
wherein by the operation member being pressed downward, the elastic bodies are moved downward, the upper sheet is bent, and contact areas of the conductors and the resistors are varied, operation of the operation member is detected,
the input device further comprises a controller having first and second output terminals, analog voltage input terminals, and a trigger signal input terminal, which is capable of switching a status into one of a first mode that outputs a high level voltage only to the first output terminal and a second mode that outputs a low level voltage to the first output terminal and the high level voltage to the second output terminal, the controller is configured such that, in the first mode, the status is switched into the second mode when the analog voltage input terminals receive a voltage of a predetermined value for a specified period of time, and in the second mode, the status is switched into the first mode when the trigger signal input terminal receives the high level voltage, each two facing resistors are each connected in series to each other, a first resistor each of the two facing resistors is connected to the first output terminal and a second resistor each of the two facing resistors is grounded, the conductors each are connected to the second output terminal, and nodes of the resistors on one side are connected to the analog voltage input terminals and the trigger signal input terminal.

9. An input device according to claim 8, wherein the operation member retains the four elastic bodies, wherein the operation member is inclined, wherein the elastic bodies are moved downward, wherein the upper sheet is bent, wherein the contact areas of the conductors and the resistors are varied, and wherein a position and strength at and by which the operation member is operated are detected.

10. An input device according to claim 8, wherein
each of the nodes is connected to the trigger signal input terminal through an OR circuit; and
wherein each of the conductors is connected to the second output terminal through a reverse-current blocking diode.

11. An input device according to claim 8, wherein
the lower sheet has plural lower contacts formed thereon;
wherein the upper sheet has upper contacts formed thereon to face each of the lower contacts; and
wherein the lower contacts and the upper contacts that face each other are made conductive by the operation member provided over the upper sheet being pressed.

12. An input device according to claim 11, wherein
elastic members made of a domed metal are provided over the upper sheet to face each of the lower contacts and the upper contacts that face each other; and
wherein the elastic members are deformed by the operation member being pressed, whereby the lower contacts and the upper contacts that face each other are made conductive.

* * * * *